(12) United States Patent
Huster et al.

(10) Patent No.: US 9,664,235 B2
(45) Date of Patent: May 30, 2017

(54) SHAFT COUPLING ASSEMBLY AND METHOD FOR COUPLING SHAFTS

(71) Applicant: ALSTOM Technology Ltd, Baden (CH)

(72) Inventors: Josef Huster, Birwinken (CH); Hyazinth Hennel, Wohlen (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 388 days.

(21) Appl. No.: 14/444,333

(22) Filed: Jul. 28, 2014

(65) Prior Publication Data

US 2015/0050079 A1    Feb. 19, 2015

(30) Foreign Application Priority Data

Aug. 15, 2013  (EP) .................................... 13180497

(51) Int. Cl.
| | |
|---|---|
| *F16D 1/033* | (2006.01) |
| *F16D 1/02* | (2006.01) |

(52) U.S. Cl.
CPC ............. *F16D 1/02* (2013.01); *F16D 1/033* (2013.01); *Y10T 29/49288* (2015.01); *Y10T 403/645* (2015.01)

(58) Field of Classification Search
CPC ........... Y10T 403/645; Y10T 403/7056; F16D 1/033; F16B 3/06; F16B 31/04; F16B 31/043

See application file for complete search history.

(56) References Cited

U.S. PATENT DOCUMENTS

| | | | | |
|---|---|---|---|---|
| 3,173,522 A | * | 3/1965 | Frantisek | F16L 23/24 16/2.2 |
| 4,089,613 A | * | 5/1978 | Babbitt, Jr. | F16B 5/025 403/370 |

(Continued)

FOREIGN PATENT DOCUMENTS

| | | |
|---|---|---|
| GB | 668715 A | 3/1952 |
| GB | 2 245 326 A | 1/1992 |

(Continued)

OTHER PUBLICATIONS

Office Action (Notification of Reasons for Refusal) issued on Jul. 6, 2015, by the Japanese Patent Office in corresponding Japanese Patent Application No. 2014-165467, and an English Translation of the Office Action. (8 pages).

*Primary Examiner* — Daniel Wiley
(74) *Attorney, Agent, or Firm* — Buchanan Ingersoll & Rooney PC (57) ABSTRACT

The invention provides a coupling assembly for connecting two shafts. A first shaft includes an outward flange on one end thereof with a plurality of first holes extending through the outward flange around an axis of the first shaft. A second shaft is a hollow shaft including an inward flange on one end thereof with a plurality of second holes extending through the inward flange with same diameter of the first holes and aligning with the respective first holes. The coupling assembly includes: a coupling bolt with thread on a first end and a second end thereof, which is inserted in the first hole and the second hole. A first nut is engaged with the first end of the coupling bolt. A second nut engaged with the second end of the coupling bolt. An expansion sleeve is with its inner hole tapering from one end to another end thereof. The expansion sleeve is interposed between the coupling bolt and the first and second hole to secure the coupling bolt relative to the first and second hole; the second nut is formed (Continued)

with one end thereof having a threaded hole to engage with the coupling bolt and with the other end closed, and a profile hole smaller than the threaded hole is centrally formed on the closed end. The coupling bolt is formed with a through hole along the central axis thereof to receive an assembly tool to tighten the second nut relative to the coupling bolt. The invention also relates to a method for coupling two shafts with the coupling assembly. With this invention, it is possible to couple two shafts with access to only one side of the shaft flanges.

11 Claims, 7 Drawing Sheets

(56) References Cited

U.S. PATENT DOCUMENTS

| | | | | | |
|---|---|---|---|---|---|
| 4,095,908 | A | * | 6/1978 | Schafer | F16D 1/093 403/16 |
| 4,192,621 | A | * | 3/1980 | Barth | F16B 31/043 29/523 |
| 4,326,826 | A | * | 4/1982 | Bunyan | B23P 19/067 411/339 |
| 4,496,259 | A | * | 1/1985 | Foucher | B61F 5/26 403/14 |
| 4,685,188 | A | * | 8/1987 | Goy | B23P 11/02 29/446 |
| 4,743,138 | A | | 5/1988 | Goy | |
| 5,263,802 | A | * | 11/1993 | Fichot | B23Q 3/18 403/370 |
| 5,775,831 | A | * | 7/1998 | Mullenberg | F16B 2/14 403/258 |
| 6,039,497 | A | * | 3/2000 | Gullberg | F16B 3/06 403/15 |
| 2015/0030385 | A1 | * | 1/2015 | Bucknell | F16L 23/036 403/337 |

FOREIGN PATENT DOCUMENTS

| | | |
|---|---|---|
| JP | S51-045563 U | 4/1976 |
| JP | S62-194027 A | 8/1987 |
| JP | H09-296826 A | 11/1997 |

* cited by examiner

SHAFT COUPLING ASSEMBLY AND METHOD FOR COUPLING SHAFTS

CROSS-REFERENCE TO RELATED APPLICATIONS

This application claims priority to European application 13180497.3 filed Aug. 15, 2013, the contents of which are hereby incorporated in its entirety.

TECHNICAL FIELD

The present invention relates to a shaft coupling assembly and also relates to a method for coupling two shafts.

BACKGROUND

Figure 1:
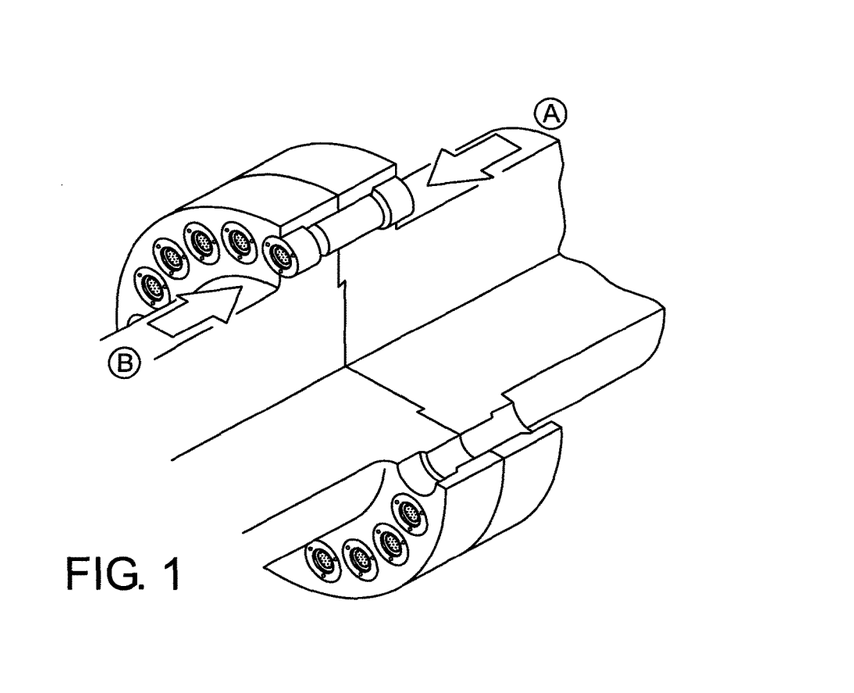
FIG. 1 shows a schematic view of the expansion sleeve coupling design in prior art.

Expansion sleeve couplings are commonly used for shaft couplings in large turbine generators for many years. In such coupling structure, the hole diameters in both coupling flanges are same, which allows honing machining together. With the conical sleeve and the conical coupling design, each coupling hole will be completely fitted without any clearances and therefore each bolt can uniformly transmit the shaft torque. The assembly and dis-assembly of the expansion sleeve coupling with the available tools can be done easily and the robustness of this design has been demonstrated on several large turbine generators. FIG. 1 gives a schematic view of such expansion sleeve coupling design. The flanges of first shaft (i.e., the generator rotor shaft) and second shaft (i.e., the turbine rotor shaft) are attached with respective holes aligned. To achieve the shaft coupling, each bolt is installed with nuts engaged from both side A and side B. Therefore, this design of expansion sleeve couplings needs the access to both sides of the shaft coupling flanges.

Recently there develops a new type of shaft coupling in turbine generator, wherein the rotor shaft of the turbine is not directly coupled with the rotor shaft of the generator, but a hollow intermediate shaft is disposed and coupled therebetween. However, for the application of hollow intermediate shaft, the assembly and dis-assembly access is only possible from one side while not possible from the intermediate shaft side, and thus the current design of expansion sleeve coupling cannot be applied. The shaft coupling configuration including the hollow intermediate shaft will be described in more detail later with reference to FIG. 2.

SUMMARY

It is an object of the present invention to solve the technical problems as indicated above. In one aspect, the invention provides a coupling assembly for connecting two shafts, wherein a first shaft 110 comprises a outward flange 140 on one end thereof with a plurality of first holes extending through the outward flange around an axis of the first shaft, and a second shaft 120 is a hollow shaft comprising an inward flange 150 on one end thereof with a plurality of second holes extending through the inward flange with same diameter of the first holes and aligning with the respective first holes, the coupling assembly comprising: a coupling bolt 101 with thread on a first end and a second end thereof, which is inserted in the first hole and the second hole; a first nut 102 engaged with the first end of the coupling bolt; a second nut 103 engaged with the second end of the coupling bolt; and an expansion sleeve 104 with its inner hole tapering from one end to another end thereof, wherein the expansion sleeve is interposed between the coupling bolt and the first and second hole to secure the coupling bolt relative to the first and second hole. The second nut 103 is formed with one end thereof having a threaded hole to engage with the coupling bolt and with the other end closed, and a profiled hole 107 smaller than the threaded hole is centrally formed on the closed end; the coupling bolt 101 is formed with a through hole 108 along the central axis thereof to receive an assembly tool to tighten the second nut relative to the coupling bolt.

In another aspect, the present invention provides a method for coupling two shafts with the coupling assembly as mentioned above, comprising the following steps:
a) pre-assembling the second nut 103 into the second hole in the inward flange 150 of the second shaft 120;
b) aligning the first shaft 110 with the second shaft 120 by aligning the respective first hole in the outward flange 140 of the first shaft with the second hole in the inward flange 150 of the second shaft;
c) inserting the coupling bolt 101 through the first and second hole;
d) inserting the expansion sleeve 104 between the coupling bolt and the first and second hole and pre-tensioning to secure the coupling bolt relative to the first and second hole;
e) using an assembly tool to insert through the through hole 108 of the coupling bolt and the profiled hole 107 of the second nut, and tighten the second nut relative to the coupling bolt;
f) installing the first nut 102 to tighten the first nut relative to the coupling bolt.

With the shaft coupling design of present invention, the shafts can be coupled with access to only one side during the assembling process. Further, the whole structure of the coupling assembly is simple, which allows the intermediate shaft to reduce its length to a minimum and makes an easily coupling and dis-coupling of the shafts.

Another advantage is that the first hole of the first shaft and the second hole of the second shaft can be honed together in one honing step.

BRIEF DESCRIPTION OF THE DRAWINGS

The invention shall subsequently be explained in more detail based on exemplary embodiments in conjunction with the drawing. In the drawing.

DETAILED DESCRIPTION

Figure 2:
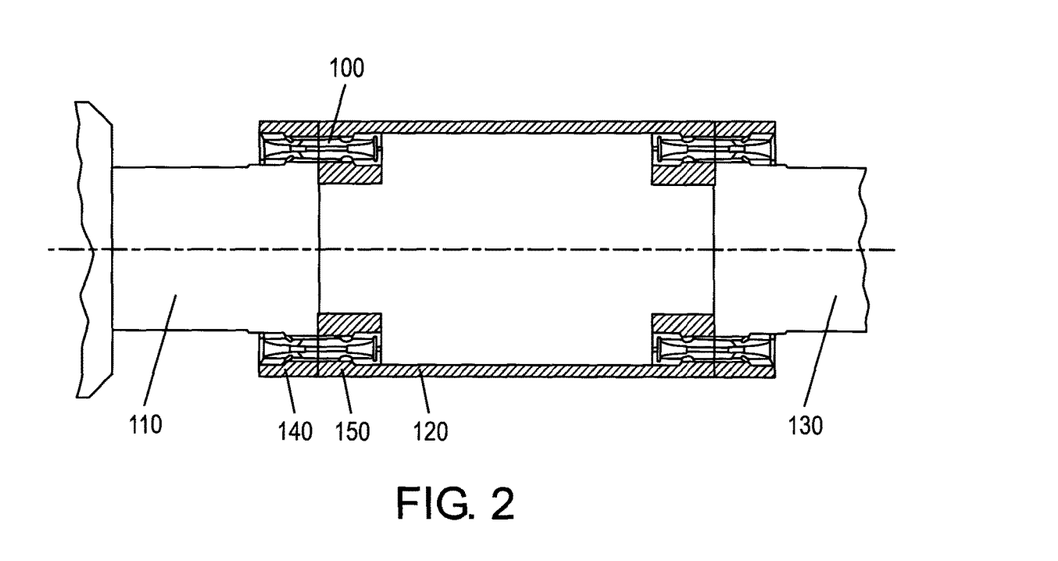
FIG. 2 shows a schematic view of the shaft coupling configuration including a hollow intermediate shaft for which the shaft coupling assembly of the present invention is applied.

FIG. 2 shows a shaft coupling configuration, wherein a hollow intermediate shaft 120 (i.e., second shaft 120) is disposed between a first shaft 110 and a third shaft 130. The first and third shafts can be turbine rotor shaft and generator rotor shaft respectively. The first shaft 110 is similar to the shaft as shown in perspective view of FIG. 1. The first shaft 110 includes an outward flange 140 with a plurality of holes extending therethrough around the axis of the first shaft. The second shaft 120 includes inward flanges 150 on its both ends. Each inward flange comprises a plurality of holes extending therethrough around the axis of the second shaft 120. The holes in the inward flange 150 of the second shaft 120 and the outward flange 140 of the first shaft 110 have same diameter. The outward flange 140 of the first shaft 110 and one of the inward flanges 150 of the second shaft 120 are attached with respective holes in alignment, and then coupled together using a plurality of coupling assemblies 100. This configuration also applies to the coupling of the second shaft 120 and the third shaft 130. In this way, two shafts 110 and 130 are coupled by the second shaft 120.

Figure 3:
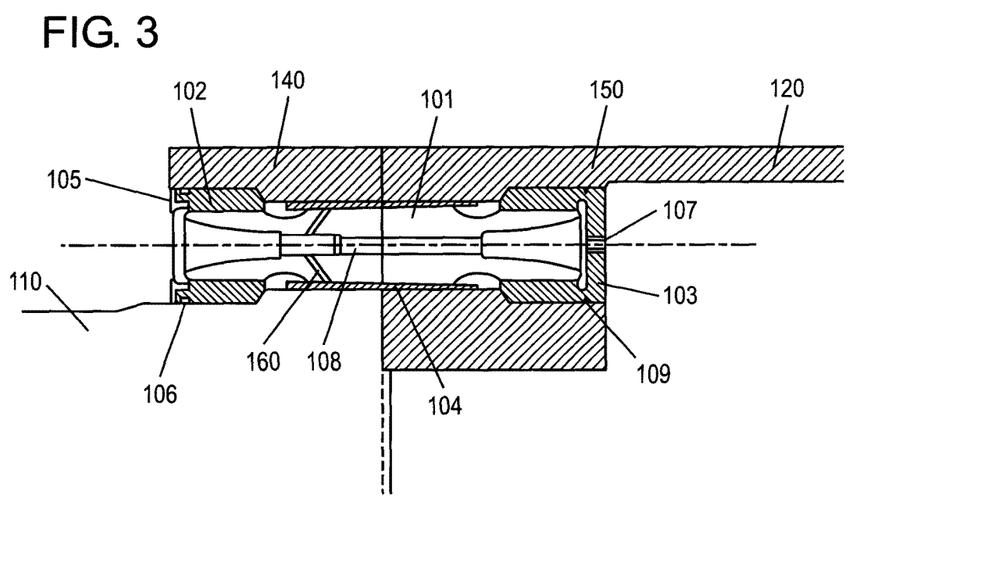
FIG. 3 shows a cross-section side view of the shaft coupling assembly of the present invention.

FIG. 3 provides a cross-section side view showing the components of a coupling assembly 100 according to one example embodiment of the present invention. The coupling assembly 100 comprises a coupling bolt 101, a first nut 102, a second nut 103 and an expansion sleeve 104. The coupling bolt 101 has threads on a first end and a second end thereof and is inserted in the holes of the first shaft 110 and the second shaft 120. The first nut 102 is engaged with the first end of the coupling bolt 101. The second nut 103 is some different from the normal nut. One end of the second nut 103 is formed with threaded hole to engage with the second end of the coupling bolt 101; the other end of the second nut 103 is closed except that a profiled hole 107 smaller than the threaded hole is centrally formed on that closed end. In one example embodiment, the profiled hole is a hexagonal hole 107. The expansion sleeve 104 is a conical sleeve with its inner hole tapering from one end to another end thereof. The expansion sleeve 104 is interposed between the coupling bolt 101 and the holes of the first shaft 110 and the second shaft 120 to secure the coupling bolt relative to the holes. The coupling bolt 101 further comprises a through hole 108 formed through the bolt 101 along its central axis. The through hole 108 and the hexagonal hole 107 can receive an assembly tool therethrough to tighten the second nut 103 relative to the coupling bolt 101. In one example embodiment, the coupling bolt 101 also comprises oil channels 160 to connect the through hole 108 with outside where the expansion sleeve 104 is disposed.

In one example embodiment, a cover cap 105 is disposed next to the first nut 102 with the corresponding shape and size of the hole of the outward flange 140 of the first shaft 110 so as to close the hole. Further, a first locking ring 106 can be arranged around the cover cap 105 within the hole to lock the cover cap relative to the outward flange 140 of the first shaft 110.

In one example embodiment, a second locking ring 109 is disposed around the second nut 103 within the hole of the inward flange 150 so as to lock the second nut relative to the inward flange. Both the first locking ring and second locking ring can be O-ring.

In one example embodiment, the expansion sleeve 104 is assembled with its inner hole tapering from the second end of the coupling bolt 101 to the first end of the coupling bolt 101.

FIG. 4A to FIG. 4F show the sequential steps for assembling the above couple assembly 100 to achieve the shaft coupling in present invention, which will be described below in detail.

Figure 4A:
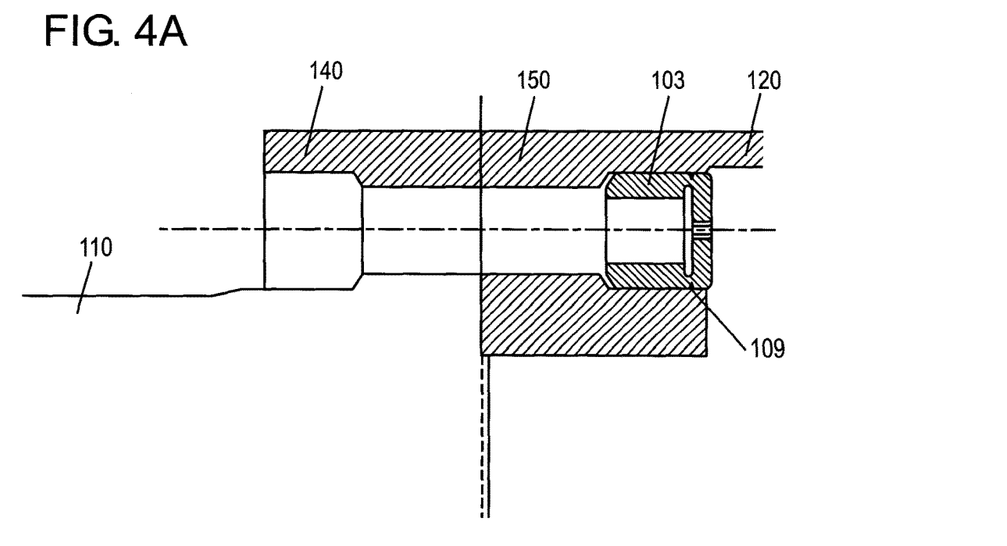
FIG. 4A to FIG. 4F show the major steps to assemble the shaft coupling assembly of the present invention.

With reference to FIG. 4A, the second nut 103 is pre-assembled into a hole of the inward flange 150 of the second shaft 120. Preferably, the second locking ring 109 can be first arranged within the hole of the inward flange 150 being stuck into a groove of the hole. The second nut 103 is preferably formed with a corresponding groove around itself. When the second nut 103 is inserted into the hole, the locking ring 109 will stick into the groove of the second nut 103, thus the second nut can be locked in the hole of the inward flange 150. Please note that, the locking ring 109 only intends to provide a slight locking action to the second nut so as to prevent the second nut from slipping out of the hole of the inward flange 150. After the second nut 103 is installed in position, the second shaft 120 is aligned with the first shaft 110 by aligning the respective holes in the inward flange 150 and the outward flange 140.

Figure 4B:
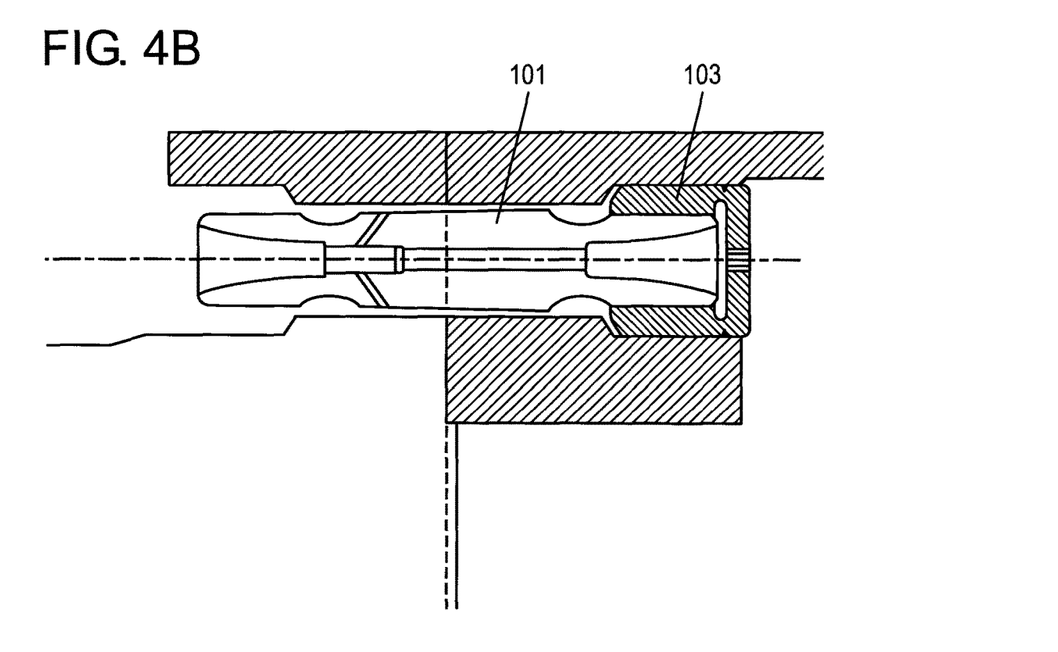

With reference to FIG. 4B, the coupling bolt 101 is inserted through the holes of the first shaft 110 and second shaft 120. The second end of the coupling bolt 101 is partially inserted into the second nut 103. Because of the locking action by the second locking ring 109, the second nut 103 will not slip out due to the insertion of the coupling bolt 101.

Figure 4C:
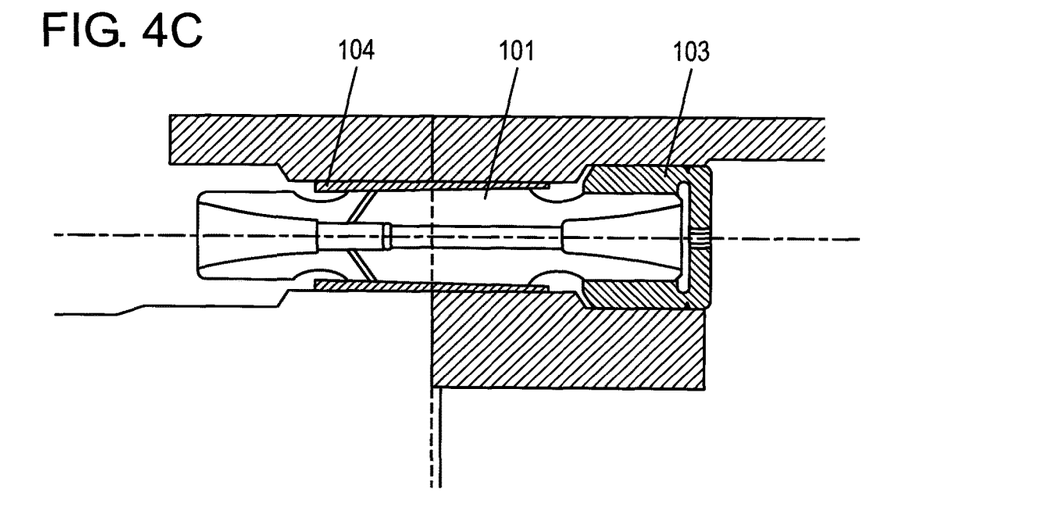

With reference to FIG. 4C, the expansion sleeve 104 is inserted between the coupling bolt 101 and the holes of the first shaft 110 and second shaft 120. As the coupling bolt 101 is not already screwed into the second nut 103, it can expand into both directions when a pretension force is applied onto the bolt 101. Because of this, a defined pretension of the expansion sleeve 104 can be achieved, which is evenly distributed over the whole length of the expansion sleeve 104. This leads to a precise form fit between the sleeve 104 and the holes of the first and second shaft.

Figure 4D:
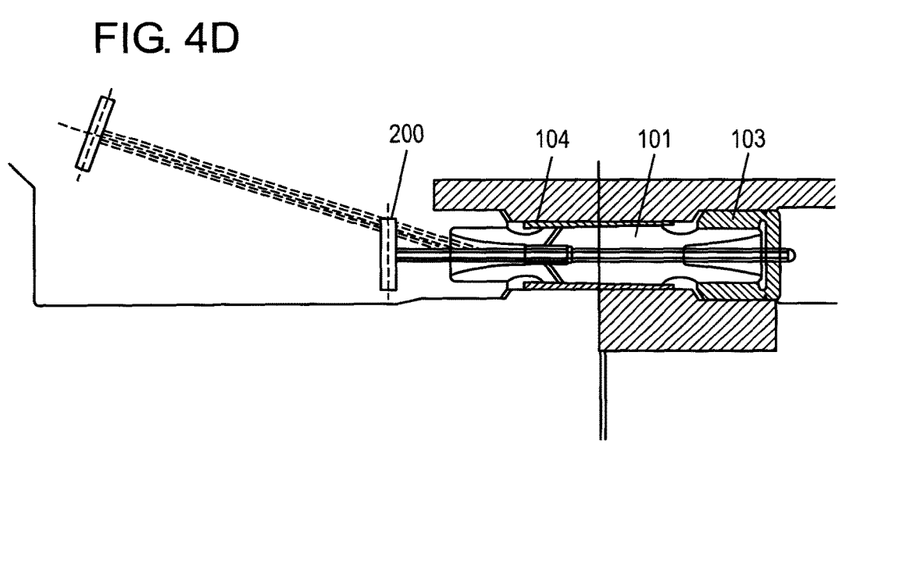

With reference to FIG. 4D, after the expansion sleeve 104 is installed with pre-tension to secure the coupling bolt, an assembling tool 200, such as an Allen wrench, is inserted through the though hole 108 of the coupling bolt 101 and fitted with the hexagonal hole 107 of the second nut 103. Then the tool 200 is activated to rotate the second nut 103 so as to tighten the second nut relative to the coupling bolt. Because the coupling bolt 101 has been secured by the expansion sleeve 104, when the second nut 103 is rotated, the coupling bolt will not slip due to the rotation of the second nut, thus an effective tightening of the second nut relative to the coupling bolt can be achieved. Besides, as the locking action imposed by the second locking ring 109 is slight, when the second nut 103 is tightened, it is able to easily overcome the locking action so as to move toward the coupling bolt 101.

Figure 4E:
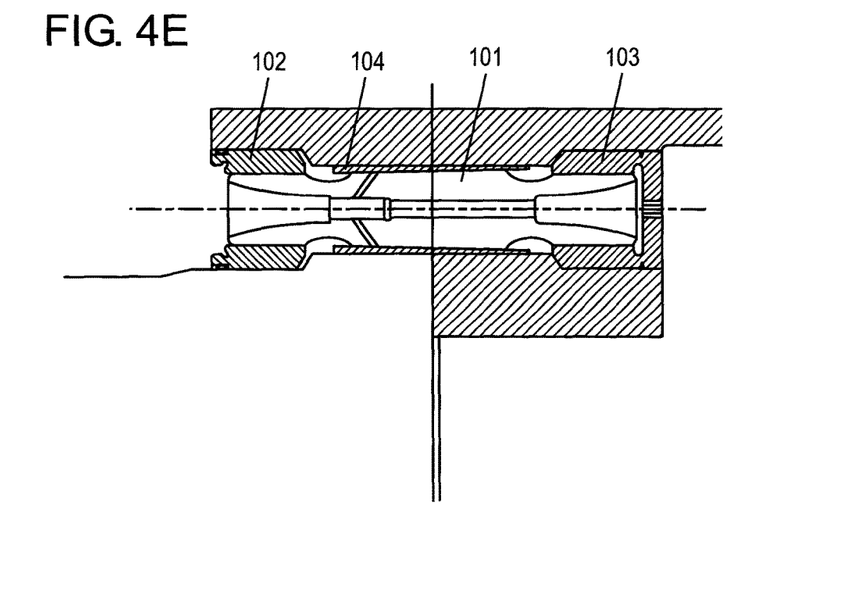

With reference to FIG. 4E, after the second nut 103 is tightened, the assembling tool 200 is removed and then the first nut 102 is tightened with the first end of the coupling bolt 101.

Figure 4F:
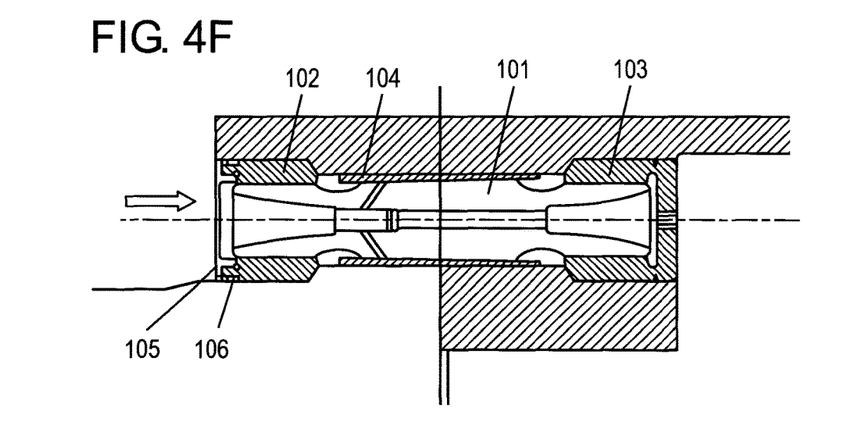

With reference to FIG. 4F, the cover cap 105 is installed together with the first locking ring 106 next to the first nut 102, so as to close the hole of the outward flange 140 and lock in position.

The assembling process as described above similarly applies to all the couple assemblies 100 till the coupling of the first shaft and second shaft is done. With this assembling method, it is possible to couple two shafts with access to only one side of the shaft flanges.

FIG. 5A to FIG. 5D show the major steps to dis-assemble the couple assembly 100, which is described in brief below.

Figure 5A:
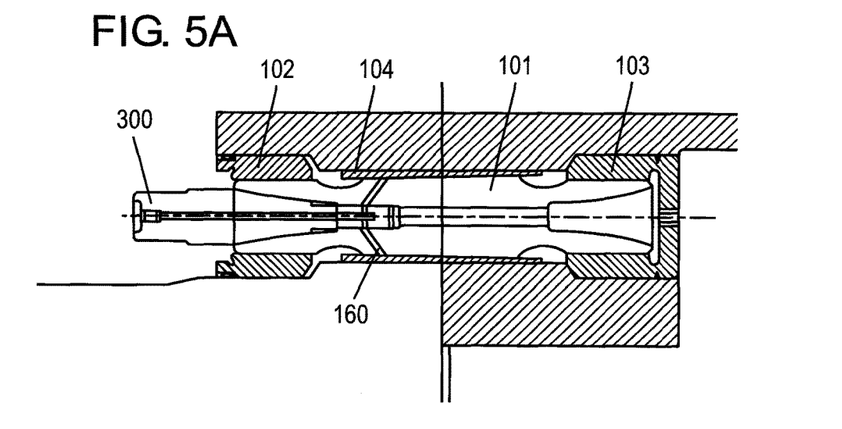
FIG. 5A to FIG. 5D show the major steps to dis-assemble the shaft coupling assembly of the present invention.

In FIG. 5A, the locking ring 106 and the cover cap 105 has been removed. Then, an oil injector 300 is inserted into the through hole 108 of the coupling bolt 101. The pressurized oil is injected from the oil injector 300 to the expansion sleeve 104 through the oil channel 160. With the action of the pressurized oil, the pre-tension between the coupling bolt 101 and the expansion sleeve 104 can be released.

Figure 5B:
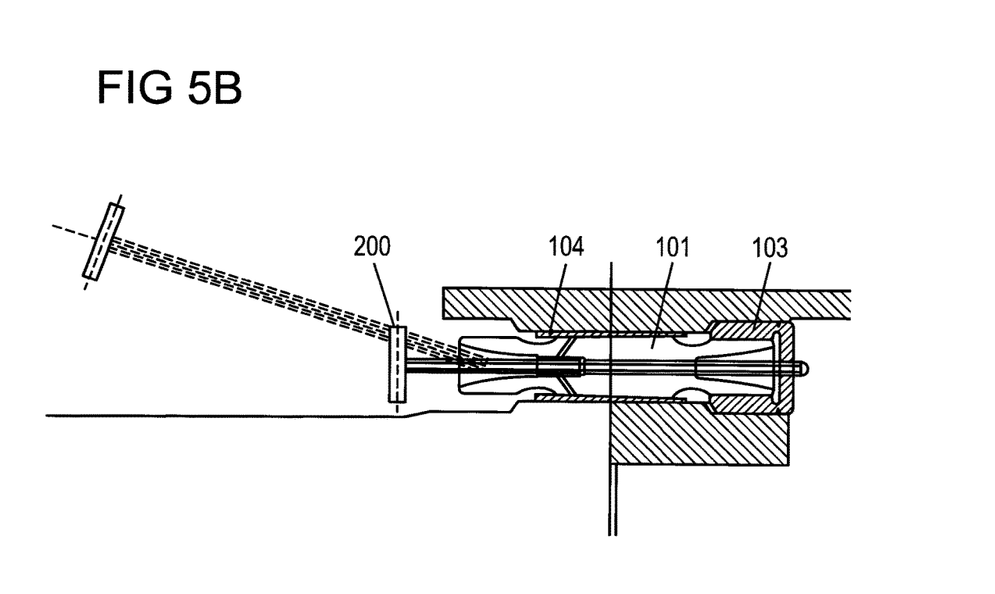

In FIG. 5B, the oil injector 300 is removed and the first nut 102 is also dis-assembled. Then the assembling tool 200 is inserted to loosen the second nut 103 relative to the coupling bolt 101.

Figure 5C:
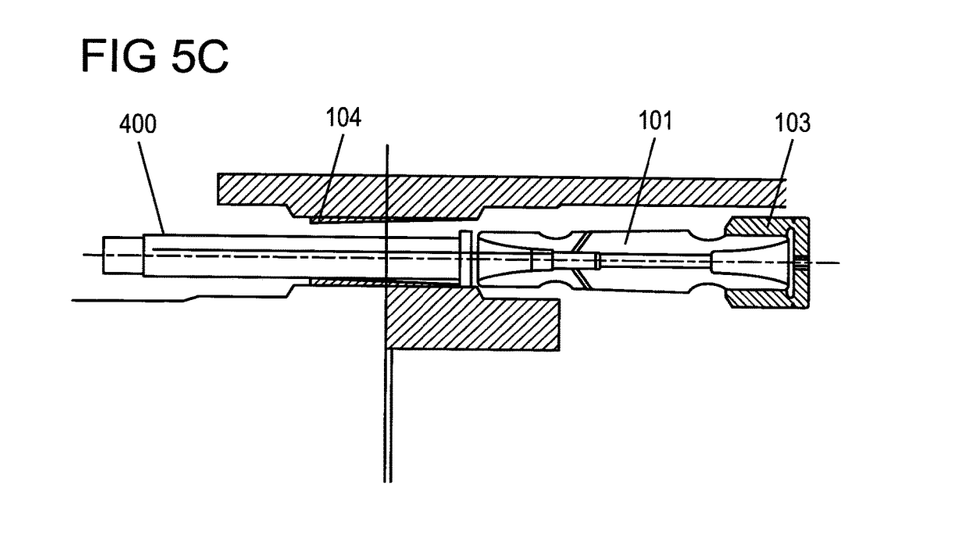

In FIG. 5C, after the second nut 103 is loosened, a dis-assembly tool 400 is used to push the coupling bolt 101 out of inner hole of the expansion sleeve 104. Because the pre-tension between the coupling bolt 101 and the expansion sleeve 104 has been released by the pressured oil in the previous step, and the inner hole is tapered from the second shaft side to the first shaft side, it is possible to push out the coupling bolt from the second shaft side.

Figure 5D:
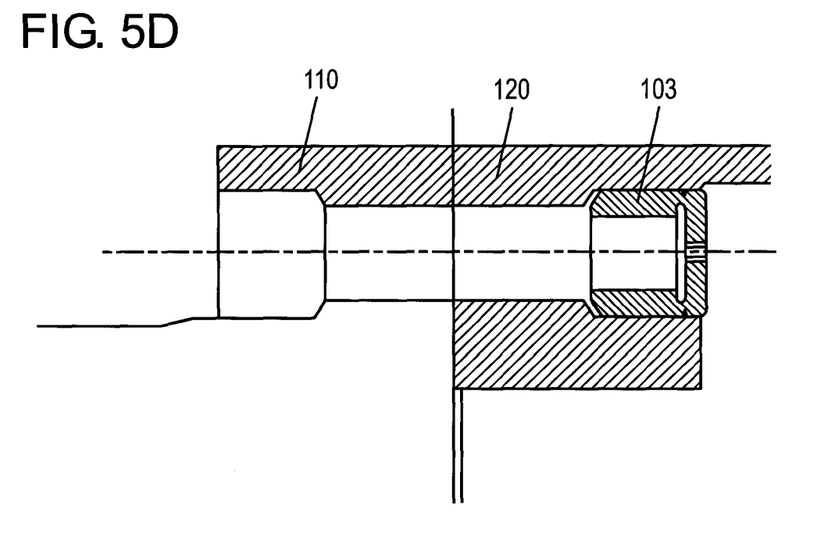

In FIG. 5D, after the coupling bolt 101 is pushed out of the expansion sleeve 104, the expansion sleeve 104 can be easily removed and then the coupling bolt 101 will be removed from the first shaft side. Thus the couple assembly 100 is dis-assembled.

This dis-assembling process similarly applies to all the couple assemblies 100 and then the two shafts are dis-coupled with access to only one side of the shaft flanges.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A coupling assembly for connecting two shafts, wherein a first shaft includes an outward flange on one end thereof with a plurality of first holes extending through the outward flange around an axis of the first shaft, and a second shaft is a hollow shaft having an inward flange on one end thereof with a plurality of second holes extending through the inward flange with a same diameter of the first holes and aligning with the respective first holes, the coupling assembly comprising:
a coupling bolt with thread on a first end and a second end thereof, configured for insertion in a first hole of the plurality of first holes and a second hole of the plurality of second holes;
a first nut engaged with the first end of the coupling bolt;
a second nut engaged with the second end of the coupling bolt; and
an expansion sleeve including an inner hole tapering from one end to another end thereof, wherein the expansion sleeve is interposed between the coupling bolt and the first and second holes to secure the coupling bolt relative to the first and second holes;
wherein the second nut is formed with one end thereof having a threaded hole to engage with the second end of the coupling bolt and with the other end closed, and a profiled hole smaller than the threaded hole is centrally formed on the closed end;
the coupling bolt being formed with a through hole along a central axis thereof to receive an assembly tool to tighten the second nut relative to the coupling bolt.

2. The coupling assembly of claim 1, wherein the profiled hole in the second nut is a hexagonal hole.

3. The coupling assembly of claim 1, wherein the expansion sleeve is assembled with its inner hole tapering from the second end of the coupling bolt to the first end of the coupling bolt.

4. The coupling assembly of claim 1, comprising:
a cover cap disposed next to the first nut to close the first hole.

5. The coupling assembly of claim 4, comprising:
a first locking ring disposed around the cover cap to lock the cover cap relative to an outward flange of the first shaft.

6. The coupling assembly of claim 1, comprising:
a second locking ring disposed around the second nut to lock the second nut relative to an inward flange of the second shaft.

7. The coupling assembly of claim 1, in combination with:
a first shaft having an outward flange on one end thereof with a plurality of first holes extending through the outward flange around an axis of the first shaft; and
a second shaft which is a hollow shaft having an inward flange on one end thereof with a plurality of second holes extending through the inward flange with a same diameter of the first holes and aligning with the respective first holes.

8. A method for coupling two shafts with a coupling assembly, comprising:
providing a first shaft having an outward flange on one end thereof with a plurality of first holes extending through the outward flange around an axis of the first shaft;
providing a second shaft that is hollow and includes an inward flange on one end thereof with a plurality of second holes extending through the inward flange and having a same diameter as the plurality of first holes and aligning with the plurality of first holes;
providing a coupling assembly comprising:
a coupling bolt with thread on a first end and a second end thereof, configured for insertion in a first hole of the plurality of first holes and a second hole of the plurality of second holes, the coupling bolt having a through hole formed along a central axis thereof;
a first nut engaged with the first end of the coupling bolt;
a second nut engaged with the second end of the coupling bolt; and
an expansion sleeve including an inner hole tapering from one end to another end thereof, wherein the expansion sleeve is configured to be interposed between the coupling bolt and the first and second holes to secure the coupling bolt relative to the first and second holes;
pre-assembling the second nut into a second hole of the plurality of second holes in the inward flange of the second shaft;
aligning the first shaft with the second shaft by aligning a first hole of the plurality of first holes in the outward flange of the first shaft with the second hole in the inward flange of the second shaft;
inserting the coupling bolt through the first and second holes;
inserting the expansion sleeve between the coupling bolt and the first and second holes, and pre-tensioning the expansion sleeve to secure the coupling bolt relative to the first and second holes;

using an assembly tool to insert through the through hole of the coupling bolt and the profiled hole of the second nut and tighten the second nut relative to the coupling bolt;

installing the first nut to tighten the first nut relative to the coupling bolt.

9. The method of claim 8, wherein the expansion sleeve is inserted with its inner hole tapering from the second end of the coupling bolt to the first end of the coupling bolt.

10. The method of claim 8, further comprising: the step of: installing a cover cap together with a first locking ring next to the first nut to close the first hole and lock the first nut in position.

11. The method of claim 8, further comprising the step of: installing a second locking ring within the second hole of the inward flange, to lock around the second nut when the second nut is installed in position.

\* \* \* \* \*